June 13, 1967  J. M. TANENBAUM  3,325,619
CONSUMABLE NOZZLE FOR ELECTROSLAG WELDING
Filed March 7, 1966  2 Sheets-Sheet 1

INVENTOR
JOSEPH M. TANENBAUM

Douglas S. Johnson
Attorney

June 13, 1967  J. M. TANENBAUM  3,325,619
CONSUMABLE NOZZLE FOR ELECTROSLAG WELDING
Filed March 7, 1966  2 Sheets-Sheet 2

INVENTOR
JOSEPH M. TANENBAUM

Douglas A. Johnson
Attorney

United States Patent Office 3,325,619
Patented June 13, 1967

3,325,619
CONSUMABLE NOZZLE FOR ELECTROSLAG
WELDING
Joseph M. Tanenbaum, 4 Dewbourne Ave.,
Toronto 10, Ontario, Canada
Filed Mar. 7, 1966, Ser. No. 532,431
Claims priority, application Canada, Feb. 4, 1966, 951,479
1 Claim. (Cl. 219—73)

This invention relates to improvements in the electro slag process for butt welding plates and is particularly concerned with the manufacture of consumable nozzles having an open ended channel through which the current carrying welding wire is supplied in the electro slag process.

In recent years an electro slag process has been developed of butt welding two plates disposed in a substantially vertical disposition, the lower ends of the plates being sealed, with adjacent portions surrounded by copper shoes which contain molten slag with metal underneath. At the start of the process an arc initiated by passage of current through a welding wire is struck under a granulated flux. After a short while, which is generally about 30 seconds, sufficient of this flux has been melted so that the arc is extinguished and a condition arises in which the voltage drop across the conductive slag serves as a means of maintaining the temperature of the slag bath. The slag bath, the temperature of which is above the melting point of the material being welded, melts the edges of the plates to be joined and also serves as a preheating medium because the upward rate of thermal conduction is greater than the welding speed.

In this process of slag welding the electrode wire is fed down between the edges of the two plates; to prevent a short circuit above the melt, also achieving ease and uniformity of feed by supplying sufficient weld metal, it has been the practice to support the welding wire in a consumable nozzle of considerable length. The consumable nozzle is fused as the welding process proceeds and weld metal is built up between the adjacent ends of the bar.

In the past these nozzles have been best produced by piercing a billet of suitable material, e.g. steel, after which the product is drawn into a tube form, the outside diameter of which is small enough to be inserted into the gap between the two plates which are to be welded and without touching the sides thereof. For usual applications the tube forming the consumable nozzle has an inside diameter of approximately ⅛" and since the rod is generally required to be four to five feet long this method of production is costly since it is extremely difficult to draw a rod of this size to the prescribed specifications. Also occasionally the consumable nozzle attains a temperature above the melt which causes it to sag and thereby induce a short circuit to the ends of the plate above the granular flux.

It is an object of the invention to provide an improved method of electro slag welding of plates.

According to one aspect of the present invention the improvement in the method of electro slag welding comprises forming sections each with a longitudinal depression on one face, aligning the sections in fixed relation whereby the opposed depressions form an open ended channel, positioning said aligned sections as a consumable nozzle between a pair of plates to be welded and inserting through the open ended channel a current carrying electrode wire.

According to a further embodiment of the invention the consumable nozzles of the required length for use in the slag butt welding process is formed from sections, each having a longitudinal depression on one face which are then aligned to form an open ended channel, the sections being held together by means such as surface welding tacks or resistance welding.

According to a further embodiment of the invention the sections are surrounded by a plurality of ceramic rings which are used for the purpose of insulating the consumable nozzle from the plates which are to be butt welded; as the nozzle is consumed the lowermost ceramic ring is melted but this creates no problem because it simply forms additional slag for the purpose of providing a cover to the melt.

In a further embodiment of the invention the surface welding tacks, holding the two sections together in the requisite relation, support the ceramic rings, which are used for insulating purposes, in spaced apart relationship.

The invention will now be described in relation to the accompanying drawings, in which.

Figure 1:
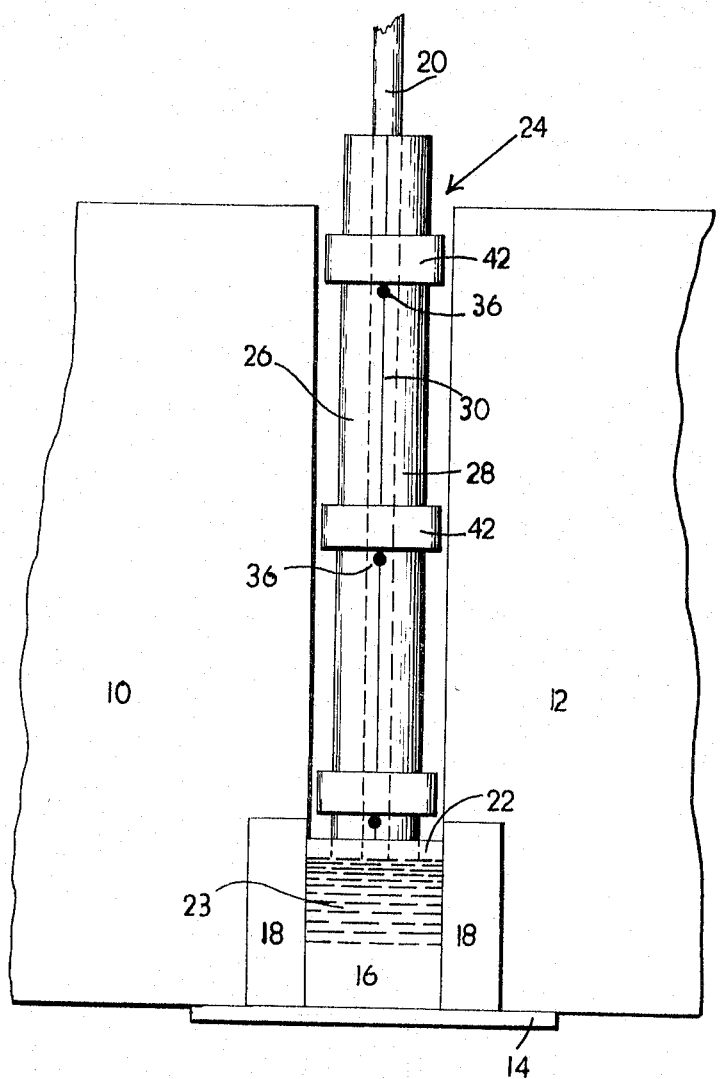
FIGURE 1 is a diagrammatic representation of the improvement in the electro slag process according to one preferred embodiment of the invention.

Referring now to FIGURE 1 in the electro slag process, which is only illustrated sufficiently to describe the invention, a pair of plates 10 and 12 are positioned in fixed substantially vertical relation whereby the ends to be welded are positioned the required distance apart. A plate 14 is welded to the lower ends of the plates 10 and 12 to provide a base to initially support the solidifying weld metal 16. A copper shoe 18 is positioned as shown in relation to the plates 10 and 12 to form a seal for the weld metal 16 and means, not shown, are provided to move the copper shoe 18 upwards as the welding progresses. A current carrying weld wire 20 extends downwards between the adjacent edges of the plates 10 and 12, the lower end of the welding wire 20 being submerged below a granular flux 22 which is melted after the arc has been struck so as to provide a cover for the liquid weld metal 23. The welding wire 20 is fed through a consumable nozzle 24 which may be of the same material as the welding wire 20 but may also be of material having the same composition as that of the plates 10 and 12.

According to the preferred form of the invention illustrated in FIGURE 1, the consumable nozzle 24 is constructed of at least two sections 26 and 28 aligned in fixed relation to provide an open ended channel 30 through which the current carrying wire 20 is fed. As illustrated more particularly in FIGURES 2 and 3 a particularly preferred form of consumable nozzle 24 consists of using the sections 26 and 28 each of half round configuration with their plane faces 32 having a longitudinal substantially half circular depression 34. To achieve a considerable reduction in cost the half round sections 26 and 28 are rolled to provide the required configuration with a smooth depression 34 though it will be appreciated that other methods, e.g., extrusion, could also be employed. It will further be appreciated that the sections 26 and 28 may be oval, rectangular, hexagonal, etc., provided that the longitudinal depression 34 is present on one of the plane faces 32.

Figure 2:
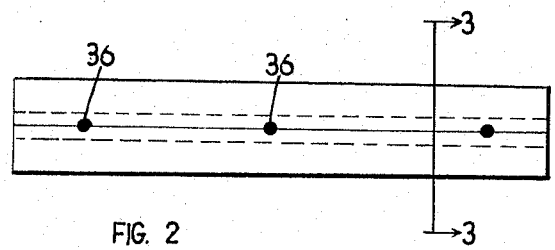
FIGURE 2 illustrates a preferred form of the consumable nozzle constructed according to the invention.
Figure 3:
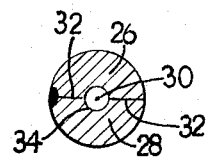
FIGURE 3 is a cross section taken on the lines 3—3 of FIGURE 2.
Figure 4:
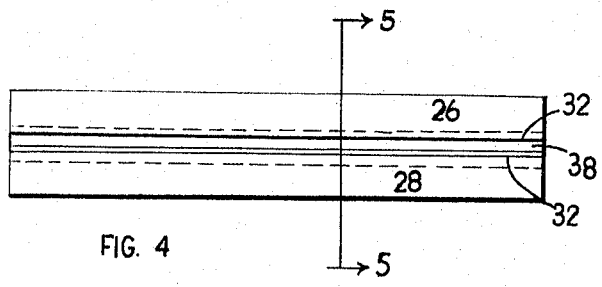
FIGURE 4 illustrates another form of consumable nozzle assembled from sections according to the invention but before they are secured in a fixed relation by resistance welding.
Figure 5:
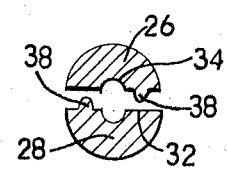
FIGURE 5 is a section taken on the lines 5—5 of FIGURE 4.
Figure 6:
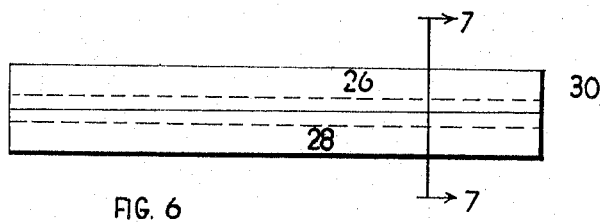
FIGURE 6 is an illustration of the assembled form shown in FIGURE 4 after resistance welding.
Figure 7:
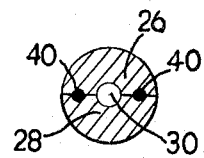
FIGURE 7 is a cross section taken on the lines 7—7 of FIGURE 6.

The consumable nozzle 24 is assembled in the preferred form shown in FIGURE 2 by means of spot welds 36, the number of which is selected to ensure that the half sections 26 and 28 are maintained in the desired position whereby the opposed depressions 34 form the open ended channel 28. As illustrated in FIGURE 3 only one side of the sections 26 and 28 need be tacked together. After assembly the consumable nozzle 24 is inserted between the plates 10 and 12, the nozzle 24 being maintained in position by means not shown.

In the further embodiment illustrated in FIGURES 4, 5, 6 and 7 the plane faces 32 of the sections 26 and 28 are each provided with a rib 38, the sections 26 and 28 being assembled as shown so that the ribs 38 are in opposed relation with respect to the open ended channel 30 formed from the opposed depressions 34. The sections 26 and 28 are clamped together and then subjected to resistance welding in the conventional manner with the result that the ribs 38 provide the weld areas 40 which is illustrated in section in FIGURE 7.

Figure 8:
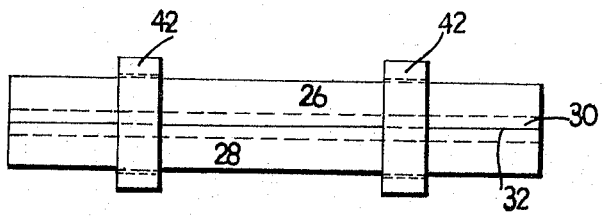
FIGURE 8 illustrates sectional consumable nozzle contained by a plurality of spaced apart ceramic rings according to a further embodiment of the invention.

As mentioned earlier a problem in the electro slag process is to prevent the consumable nozzle from short-circuiting the current to the ends of the plate above the granular flux 22. As illustrated in FIGURE 8 it is a further feature of the invention that a sectional consumable nozzle is surrounded by a plurality of spaced apart rings 42 made of a fluxing material such as ceramic. Furthermore, as illustrated the spot welds 36 provide a means for locating the ceramic rings 42 in the desired spaced apart position. As the lower end of the consumable nozzle 24 melts the level of the molten flux 22 rises and eventually reaches the ceramic ring 42 immediately above with the result that the latter is itself melted and absorbed in the flux 22 without any detriment to the welding process. As illustrated more particularly in FIGURE 1 the ceramic rings 42 are dimensioned so that their surfaces do not touch the side of the plates 10 and 12 to facilitate insertion of the contained consumable nozzle 24.

While certain embodiments have been illustrated and described for the purpose of disclosure, it will be understood that the invention is not limited thereto, but contemplates such modifications and other embodiments as may be utilized without departing from the invention.

I claim:

A consumable nozzle for use in an electro-slag welding process comprising at least two sections, each of said sections having an outer and inner surface, said inner surface of each of said sections being matingly engageable with the inner surface of the other of said sections, said inner surfaces further providing a longitudinal channel which when said two sections are secured together define a central bore to permit the passage of a consumable welding wire, means for joining said sections, said joining means being projecting surface welding tacks applied at the junction of said sections, said consumable nozzle being surrounded by spaced apart ceramic rings, with said ceramic rings individually supported by said projecting surface welding tacks.

References Cited

UNITED STATES PATENTS

| 2,121,693 | 6/1938 | Henderson | 219—74 |
| 2,442,087 | 5/1948 | Kennedy | 219—146 |
| 2,868,951 | 1/1959 | Shrubsall | 219—74 |

FOREIGN PATENTS

| 925,564 | 3/1955 | Germany. |
| 264,571 | 1/1927 | Great Britain. |

RICHARD M. WOOD, *Primary Examiner.*